US012762578B2

(12) United States Patent
Duffy et al.

(10) Patent No.: US 12,762,578 B2
(45) Date of Patent: Oct. 13, 2026

(54) SYSTEMS AND METHODS FOR DATA INSIGHTS FROM CONSUMER ACCESSIBLE DATA

(71) Applicants: ALLSTATE INSURANCE COMPANY, Northbrook, IL (US); Allstate Northern Ireland Limited, Belfast (GB)

(72) Inventors: Columb Duffy, Londonderry (GB); Brian Rice, Antrim (GB); Ryan Faulkner, Dungannon (GB); Brennan Gee, Roanoke, VA (US)

(73) Assignees: Allstate Insurance Company, Northbrook, IL (US); Allstate Northern Ireland Limited, Belfast (GB)

( * ) Notice: Subject to any disclaimer, the term of this patent is extended or adjusted under 35 U.S.C. 154(b) by 68 days.

(21) Appl. No.: 17/541,757

(22) Filed: Dec. 3, 2021

(65) Prior Publication Data

US 2023/0177528 A1 Jun. 8, 2023

(51) Int. Cl.

*G06Q 30/0201* (2023.01)
*G06F 16/242* (2019.01)
(Continued)

(52) U.S. Cl.

CPC ..... *G06Q 30/0201* (2013.01); *G06F 16/2428* (2019.01); *G06F 16/24556* (2019.01);
(Continued)

(58) Field of Classification Search

CPC ........... G06Q 30/0201; G06Q 30/0203; G06Q 30/0217; G06F 16/2471; G06F 16/2428; G06F 16/24556

See application file for complete search history.

(56) References Cited

U.S. PATENT DOCUMENTS 7,636,696 B1 * 12/2009 Sigler, Jr. ............... G06Q 20/02 705/64
8,078,885 B2 12/2011 Jobmann
(Continued)

FOREIGN PATENT DOCUMENTS

| | | | | |
|---|---|---|---|---|
| CN | 110113295 | A | * | 8/2019 |
| WO | 2020098839 | A2 | | 5/2020 |
| WO | 2020098845 | A2 | | 5/2020 |

OTHER PUBLICATIONS

Matuszewska, et al. "Why first-party data is the most valuable to marketers" (2021) (https://piwik.pro/blog/first-party-data-value/) (Year: 2021).*

(Continued)

*Primary Examiner* — Sujay Koneru
(74) *Attorney, Agent, or Firm* — Dinsmore & Shohl LLP

(57) ABSTRACT

Methods, computer-readable media, software, and apparatuses may provide data insights information to a third-party organization from consumer accessible data, accessible data via private/shared/vendor online data storage, or accessible data to devices under the control and configured by consumers. The third-party organization may compose a query comprising questions that can be answered or filled in with the consumer accessible data. A data insights server may request a response to the query from the consumers, wherein the response is derived from the consumer accessible data. The data insights server may request each of the plurality of consumer devices for the response to the query to be delivered to the requestor directly, without the insights server receiving the response. The data insights server may register responses from consumers to insight requests so as to determine compensation required to be provided from the third-party organization and to each participating/responding consumer.

20 Claims, 5 Drawing Sheets

(51) Int. Cl.

| | |
|---|---|
| ***G06F 16/2455*** | (2019.01) |
| ***G06F 16/2458*** | (2019.01) |
| ***G06Q 30/0203*** | (2023.01) |
| ***G06Q 30/0217*** | (2023.01) |

(52) U.S. Cl.

CPC ..... *G06F 16/2471* (2019.01); *G06Q 30/0203* (2013.01); *G06Q 30/0217* (2013.01)

(56) References Cited

U.S. PATENT DOCUMENTS 8,621,649 B1 * 12/2013 Van Dijk ................ G06F 21/60 726/1
9,147,042 B1 * 9/2015 Haller .................... G06Q 40/08
9,397,838 B1 7/2016 Chen
9,639,836 B2 5/2017 Bondesen et al.
9,721,268 B2 8/2017 Bondesen et al.
9,853,959 B1 12/2017 Kapczynski et al.
10,764,269 B2 9/2020 Carpenter et al.
2002/0059258 A1 * 5/2002 Kirkpatrick ........... G06F 16/951
2004/0078328 A1 * 4/2004 Talbert ................... G06Q 40/12 705/40
2004/0088219 A1 * 5/2004 Sanders ............. G06Q 30/0213 705/14.15
2007/0219794 A1 9/2007 Park et al.
2008/0313270 A1 * 12/2008 Clinick ................... G06F 21/10 709/203
2009/0192882 A1 * 7/2009 Narahashi .............. G06Q 30/02 705/7.29
2009/0287369 A1 * 11/2009 Nielsen .................. G06Q 30/00 701/31.4
2009/0327296 A1 * 12/2009 Francis ................... G06F 16/00 707/999.009
2010/0250624 A1 9/2010 Mayer et al.
2012/0095805 A1 * 4/2012 Ghosh ................ G06Q 30/0201 705/7.29
2012/0296682 A1 * 11/2012 Kumar ................... G06Q 10/00 705/7.11
2013/0030865 A1 * 1/2013 Villaverde ......... G06Q 30/0201 705/7.29
2013/0073340 A1 * 3/2013 Alex ...................... G06Q 30/02 705/7.29
2013/0227274 A1 * 8/2013 Di Crescenzo ....... H04L 63/045 713/153
2013/0232075 A1 * 9/2013 Monaghan ............. G06Q 20/40 705/44
2014/0040161 A1 * 2/2014 Berlin ................ G06Q 30/0282 705/347
2014/0081879 A1 * 3/2014 Olson ................ G06Q 30/0207 705/319
2014/0278781 A1 * 9/2014 Liu .................... G06Q 30/0203 705/7.32
2015/0073989 A1 * 3/2015 Green .................. G06Q 20/405 705/44
2015/0215305 A1 7/2015 Wetzel et al.
2015/0254699 A1 9/2015 Bondesen et al.
2016/0026999 A1 1/2016 Kurian
2016/0055349 A1 * 2/2016 Mashima ............ G06F 21/6245 726/1
2016/0210621 A1 7/2016 Khan
2016/0239853 A1 * 8/2016 Cummins .......... G06Q 30/0201
2017/0046735 A1 * 2/2017 Koh .................. G06Q 30/0269
2017/0109687 A1 * 4/2017 Kamadolli ......... G06Q 30/0201
2017/0140405 A1 * 5/2017 Gottemukkala ... G06Q 30/0206
2017/0308573 A1 * 10/2017 Brisebois .......... G06F 16/24535
2018/0150844 A1 5/2018 Dolan et al.
2018/0211248 A1 7/2018 Sims et al.
2018/0211249 A1 7/2018 Sims et al.
2018/0288570 A1 10/2018 Zumigo
2019/0095933 A1 * 3/2019 Doherty ................ H04W 4/029
2019/0305952 A1 10/2019 Hamel et al.
2019/0319932 A1 10/2019 Kandregula
2019/0325462 A1 * 10/2019 Apokatanidis ..... G06Q 30/0609
2020/0014691 A1 * 1/2020 Ortiz ................... H04L 63/0428
2020/0211099 A1 7/2020 Smith et al.
2020/0220726 A1 7/2020 Lougheed, III et al.
2020/0280444 A1 9/2020 Tang et al.
2020/0320583 A1 * 10/2020 Karapetian ........ G06Q 30/0277
2020/0387872 A1 * 12/2020 Zhou .................. G06Q 10/1053
2021/0357528 A1 * 11/2021 Cropp .................... G06Q 30/02
2021/0385196 A1 * 12/2021 Rahmat ............... H04L 63/0421
2022/0114603 A1 * 4/2022 Bonat ................ G06Q 30/0201

OTHER PUBLICATIONS

International Search Report and Written Opinion for PCT/US2022/051690, dated Mar. 31, 2023, 14 pages.

Krafft et al. "Insight is Power: Understanding the terms of the consumer-firm data exchange", Journal of Retailing vol. 97, Issue 1, Mar. 2021, pp. 133-149. Retrieved on Feb. 15, 2023. Retrieved from <URL: https://www.sciencedirect.com/science/article/pii/S0022435920300725> entire document.

Michael Kuperberg, "Blockchain-based Identity Management: A Survey from the Enterprise and Ecosystem Perspective", IEEE 2019, Blockchain and Distributed Ledgers Group, Frankfurt, Germany, 20 pgs.

"SelfKey", The SelfKey Foundation, Sep. 11, 2017, 29 pgs.

Rakesh Gohel, "Verifiable Credentials—Your Digital Proof", Unique Identity, Mar. 25, 2020, 8 pgs.

"Tamper-proof Digital Identities Made Easy", Book Demo, 2020, 26 pgs.

Mehmet Aydar et al., "Towards a Blockchain Based Digital Identity Verification, Record Attestation and Record Sharing System", Jun. 25, 2019, https://researchgate.net/publication/333993279, 26 pgs.

* cited by examiner

SYSTEMS AND METHODS FOR DATA INSIGHTS FROM CONSUMER ACCESSIBLE DATA

FIELD OF ART

Aspects of the disclosure generally relate to methods and computer systems, including one or more computers particularly configured and/or executing computer software. More specifically, aspects of this disclosure relate to methods and systems for data insights from consumer accessible data.

BACKGROUND

Currently, there are many digital identity and internet challenges today. First, too many passwords leads to authentication providers brokering authentication and learning behaviors of consumers. Second, digital trust is one-way with consumers authenticating with a website, but the website does not authenticate with the consumer. This can lead to phishing. Third, there are data quality concerns and high-trust transaction needs (e.g. opening a bank account requiring strong know-your-customer (KYC) information). These concerns and needs may be expensive for in-house experts to prevent fraud and may require external data verification services. Lastly, data centralization may create attractive targets for hackers and provide high risk and expense for enterprises and organizations to protect.

As consumers continue to utilize digital environments and use digital identities, there will be a need to improve the decentralized digital identity architecture.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable storage media, software, systems, and apparatuses to provide data insights information to a third-party organization from consumer accessible data.

In some aspects, the system may include at least one processor and a memory unit storing computer-executable instructions. The system may be configured to, in operation, receive, at a data insights server, a query from a processor at a third-party organization in communication with the data insights server. The data insights server may be linked and in communication with a plurality of consumer devices from a plurality of consumers. The system may also be configured to, in operation, send, by the data insights server, the query from the third-party organization to each of the plurality of consumer devices from the plurality of consumers. The system may also be configured to, in operation, request, by the data insights server, a response to the query from each of the plurality of consumers to be sent directly to the third-party organization that requested the insight. Each individual response from the plurality of consumers may include one or more elements of consumer data from the consumer. The consumer data may be derived from consumer accessible data of the individual consumer in the plurality of consumers. The consumer accessible data may include verifiable credentials found in digital wallets of consumer, or data stored in the consumer device, or data configured to be accessible to the device and permitted by the consumer to be used in the processing of a data insight request.

In other embodiments, the query may comprise a plurality of consumer identity information and a plurality of consumer commerce information. The system may be configured to, in operation, compose, by the data insights server, the query from the third-party organization. The query may include selected fields for building a plurality of questions for the query. Additionally, the query includes one or more fields filled in with the consumer data from the consumer accessible data. The system may be configured to, in operation, verify, by the data insights server, the query from the third-party organization. The consumer accessible data may include one or more of social media information or personal cloud drive storage that the plurality of consumers chose to use in processing or the insight request. The system may be configured to, in operation, provide, by the data insights server, a reward to the each of the plurality of consumers for providing the response to the insight request. Additionally, the reward may comprise one or more of the following: a monetary reward, a consumer goods discount, a services discount, or a digital dividend.

Of course, the methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

In accordance with various aspects of the disclosure, methods, computer-readable media, software, and apparatuses are disclosed for providing data insights information to a third-party organization from consumer accessible data. The consumer accessible data may include verifiable credentials found in digital wallets of consumers. The digital wallets of the consumers may be located in one or more consumer devices of consumers. The third-party organization may request and/or compose a query comprising questions that can be answered or filled in with consumer accessible data. A data insights server may request a response to the query from the consumers, wherein the response is derived from the consumer accessible data, including any verifiable credential issued to the consumer. The data insights server may request each of the plurality of consumer devices to search the consumer accessible data for the response to the query. The consumer device may be requested, in operation, to send and provide the data insights response to the third-party organization directly.

The data insights server does not receive the data from the consumer. In this way, no consumer identifiable information is disclosed. The data insights server knows which consumers provide a response, but not the response nor the data used, and the third-party organization sees the responses but does not know which consumer provided the response. This three-way 'triangle' of privacy enables third-party organizations to get insights from a wide, more holistic data set related to consumers, without leaking identity of the consumer, while enabling a reward to be provided.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
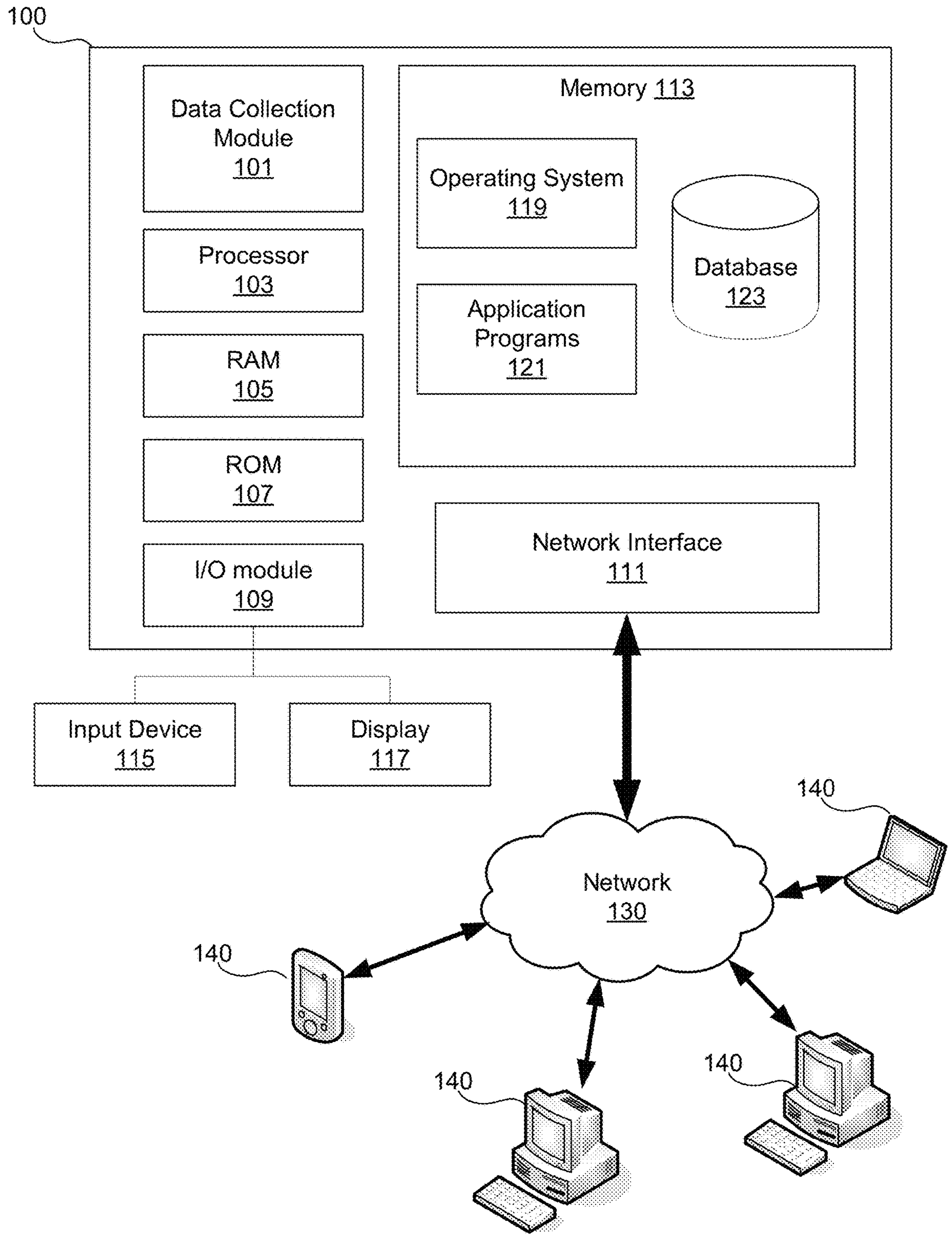
FIG. 1 illustrates a block diagram of an exemplary digital identity device that may be used in accordance with one or more aspects described herein.

In one or more arrangements, aspects of the present disclosure may be implemented with a computing device. FIG. 1 illustrates a block diagram of an example digital identity device 100 that may be used in accordance with aspects described herein. The digital identity device 100 may be a computing device, such as a personal computer (e.g., a desktop computer), server, laptop computer, notebook, tablet, smartphone, vehicles, home management devices, home security devices, smart appliances, etc. The digital identity device 100 may have a data collection module 101 for retrieving and/or analyzing data as described herein. The data collection module 101 may be implemented with one or more processors and one or more storage units (e.g., databases, RAM, ROM, and other computer-readable media), one or more application specific integrated circuits (ASICs), and/or other hardware components (e.g., resistors, capacitors, power sources, switches, multiplexers, transistors, inverters, etc.). Throughout this disclosure, the data collection module 101 may refer to the software and/or hardware used to implement the data collection module 101. In cases where the data collection module 101 includes one or more processors, such processors may be specially configured to perform the processes disclosed herein. Additionally, or alternatively, the data collection module 101 may include one or more processors configured to execute computer-executable instructions, which may be stored on a storage medium, to perform the processes disclosed herein. In some examples, the digital identity device 100 may include one or more processors 103 in addition to, or instead of, the data collection module 101. The processor(s) 103 may be configured to operate in conjunction with data collection module 101. Both the data collection module 101 and the processor(s) 103 may be capable of controlling operations of the digital identity device 100 and its associated components, including RAM 105, ROM 107, an input/output (I/O) module 109, a network interface 111, and memory 113. For example, the data collection module 101 and processor(s) 103 may each be configured to read/write computer-executable instructions and other values from/to the RAM 105, ROM 107, and memory 113. The processor 103 may include one or more computer processing units (CPUs), graphical processing units (GPUs), and/or other processing units such as a processor adapted to perform computations associated with machine learning and machine learning algorithms.

The I/O module 109 may be configured to be connected to an input device 115, such as a microphone, keypad, keyboard, touchscreen, and/or stylus through which a user of the digital identity device 100 may provide input data. The I/O module 109 may also be configured to be connected to a display device 117, such as a monitor, television, touchscreen, etc., and may include a graphics card. The display device 117 and input device 115 are shown as separate elements from the digital identity device 100; however, they may be within the same structure. On some digital identity devices 100, the input device 115 may be operated by users to interact with the data collection module 101, including providing user information and/or preferences, device information, account information, warning/suggestion messages, etc., as described in further detail below. System administrators may use the input device 115 to make updates to the data collection module 101, such as software updates. Meanwhile, the display device 117 may assist the system administrators and users to confirm/appreciate their inputs.

The memory 113 may be any computer-readable medium for storing computer-executable instructions (e.g., software). The instructions stored within memory 113 may enable the digital identity device 100 to perform various functions. For example, memory 113 may store software used by the digital identity device 100, such as an operating system 119 and application programs 121, and may include an associated database 123.

The network interface 111 may allow the digital identity device 100 to connect to and communicate with a network 130. The network 130 may be any type of network, including a local area network (LAN) and/or a wide area network (WAN), such as the Internet, a cellular network, or a satellite network. Through the network 130, the digital identity device 100 may communicate with one or more other computing devices 140, such as laptops, notebooks, smartphones, tablets, personal computers, servers, vehicles, home management devices, home security devices, smart appliances, etc. The computing devices 140 may also be configured in a similar manner as digital identity device 100. In some embodiments the digital identity device 100 may be connected to the computing devices 140 to form a "cloud" computing environment.

The network interface 111 may connect to the network 130 via communication lines, such as coaxial cable, fiber optic cable, etc., or wirelessly using a cellular backhaul or a wireless standard, such as IEEE 802.11, IEEE 802.15, IEEE 802.16, etc. In some embodiments, the network interface 111 may include a modem. Further, the network interface 111 may use various protocols, including TCP/IP, Ethernet, File Transfer Protocol (FTP), Hypertext Transfer Protocol (HTTP), etc., to communicate with other computing devices 140.

The disclosure is operational with numerous other general purpose and/or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable user electronics, network PCs, minicomputers, mainframe computers, mobile telephones, smart phones, and distributed computing environments that include any of the above systems or devices, and the like.

Aspects of the disclosure may be described in the general context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

The following is a list of general definitions that may be known and used in the art for digital identity and/or verifiable credentials.

Verifiable Digital Credential or Verifiable Credential: A digitally signed tamperproof set of data (claims) containing information about a person, entity, or thing, as defined by the World Wide Web Consortium (W3C) Verifiable Credentials Data Model specification.

Decentralized Identifier (DID): A globally unique identifier developed specifically for decentralized systems as defined by the W3C DID specification. DIDs enable interoperable decentralized Digital Identity management. A DID is associated with exactly one DID Document.

DID Document: The machine-readable document to which a DID points as defined by the W3C DID specification. A DID document describes the Public Keys, Service Endpoints, and other metadata associated with a DID. A DID Document is associated with exactly one DID.

Claim: A single piece of information claimed about a person, entity, or thing.

Digital Identity Agent: A software application (agent) that can be used by its owner to issue, hold, or verify verifiable digital credentials and securely communicate with other digital identity agents according to well-defined protocols Digital Wallet: Another name given a digital identity agent, implemented as a mobile app, that belongs to an individual consumer.

Connection: A secure, mutually-authenticated communication channel between two digital wallets Credential Issuer: An entity (person, organisation, business etc.) that issues verifiable digital credentials from their wallet to the holder's wallet. Issuers would normally be an organisation that is trusted to some degree and therefore their issued credentials are deemed trustworthy to some degree Credential Holder: The entity that receives an issued verifiable digital credential. The holder can later share elements of the stored credentials, or create a cryptographic proof that can be used in response to a request, without revealing the underlying data Credential Verifier: An entity that receives cryptographic proofs or credential elements from a holder. They verify the presented data/proof by checking a public ledger to ensure the digital signatures of the issuer and holder are valid and that the credentials have not been revoked Proof Request: A request originating from a verifier asking for credentials or a proof from a holder's wallet. In its simplest form it is a request for data, but could also be a request to prove that a person is at least 21 years of age Cryptographic Proof: This is what the holder presents to the verifier in response to a proof request and is used by the 'verifier' to check that signatures are correct, and the credential has not been revoked.

Figure 2:
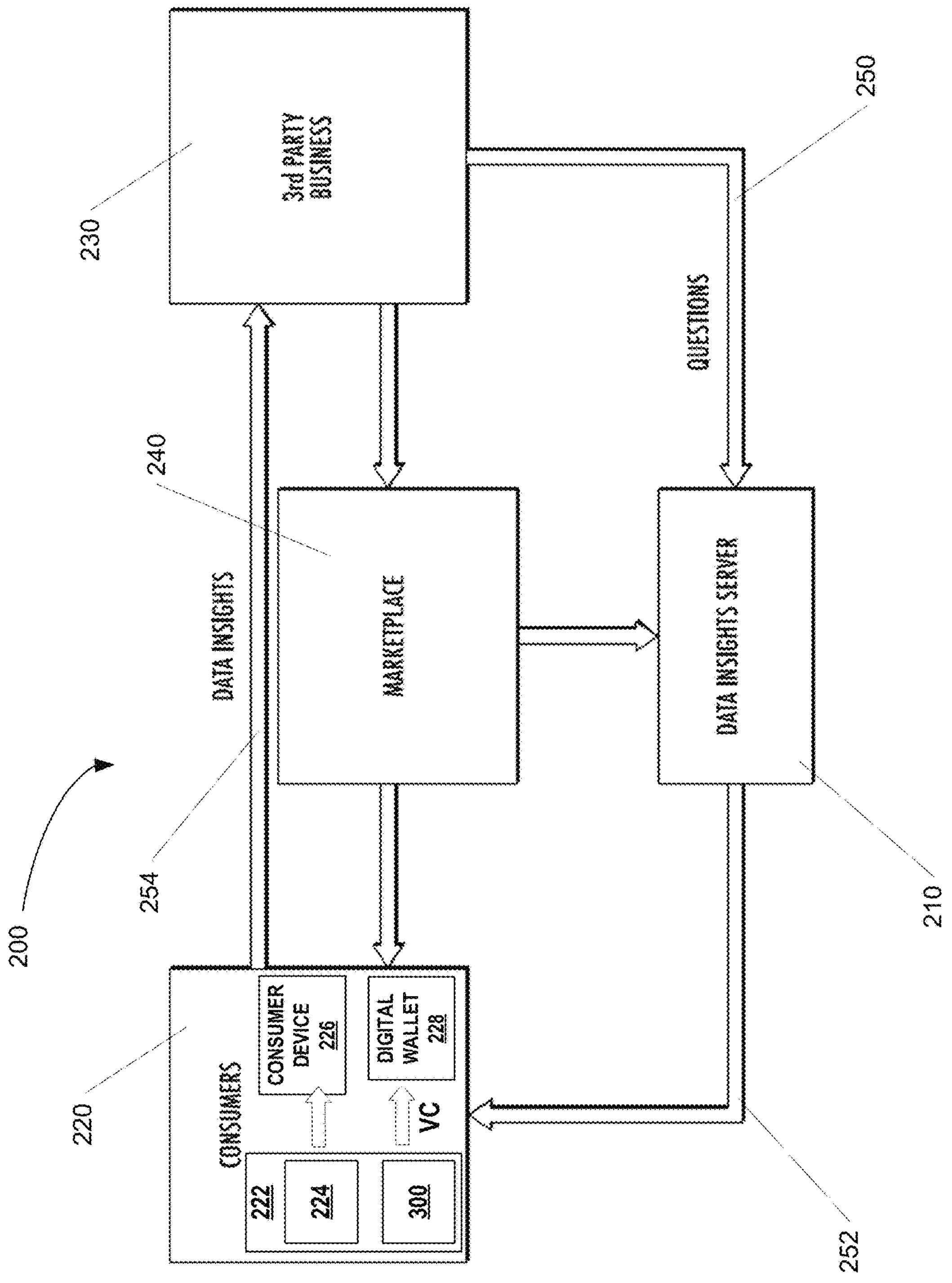
FIG. 2 illustrates a block diagram of an exemplary data insights system and data insights server in accordance with one or more aspects described herein.

FIG. 2 illustrates a system 200 for implementing methods for providing data insights information to a third-party organization from consumer accessible data available and/or found in consumer devices of consumers. The data insights system 200 may use and provide data insights questions to the consumer device to be processed rather than processing the insight request collecting the consumer data and processing the insight request and questions itself The data insights system 200 as illustrated in FIG. 2 may decentralize the data and employ edge-computing to process an insight request on the consumer device or edge device, which will combine to greatly enhance data privacy. The data insights system 200 may only know and see the query/questions but not the answers to the query/questions. The data insights system 200 may know who is involved, but not any of the data and who is providing the data. The data insights system 200 protects the consumers by permitting only questions that do not expose the consumers to risk. The data insights system 200 may utilize consumer-controlled data including verifiable credentials in digital wallets located on edge devices, such as mobile phone or other personal storage. The data insights system 200 may also utilize informed consent plus services. The data insights system 200 may search digital wallets or e-wallets from consumers for the data and information in response to the query and questions. Additionally, a consumer may specify on the consumer device the types of data with which the consumer permits to be used in processing an insight request. The consumer device may use this to respond only to insight requests that require data types that are permitted as per the consumer preferences. The data insights system 200 may record a reward entitlement for those consumers that provided data insight responses.

As illustrated in FIG. 2, the data insights system 200 may include a data insights server 210, consumers 220, and third-party businesses or organizations 230, all operating within a marketplace 240. Additionally, the data insights system 200 and the consumers 220 may include data sources 222, such as consumer accessible data 224 on a consumer device 226 and a digital identity system 300. The data sources 222 used are not limited to verifiable credentials. Consumer accessible data 224 may include any data that the consumer can access, including their social media, personal files, or personal cloud drive storage, etc. Consumer accessible data 224 used in generating an insight response may include only the types of data that the consumer 220 explicitly chooses to include in the set of data that could contribute to answer any of the data insight questions.

As illustrated at 250, a third-party business or organization 230 may request information regarding a plurality of consumers 220 through a data insights server 210. The requested information may be derived from consumer accessible data, such as physical appearance, job title, name, email address, physical home address, social security number, age, birth place, birth date, address history, employment information, employment history, college or school degree, graduation date, college or school history, utilities, financial information, home ownership, employment information, etc. The requested information may also include other consumer-specific commerce information, such as where the consumers shop, how often they shop, shopping habits, purchases, etc. The data insights server 210 may compose a query based on the information requested by the third-party organization 230. The third-party organization 230 may draft the query for the requested information through the data insights server 210. The query may contain a number of questions that may be answered by information available in verifiable credentials from the consumers. The insights server 210 may approve or deny the insight request proposed by the third-party organization 230. If approved, the data insights server will make available the insight request to a plurality of consumers.

As illustrated at 252, the data insights server 210 may make available the query and/or questions to the consumers 220. The data insights server 210 may make available the insight request from the third-party organization 230 to each of the plurality of consumer devices 226 and/or digital wallets 228 from the group of consumers 220. The data insights server 210 may then search each of the plurality of consumer devices. The consumer device 226 may determine whether the consumer data restrictions set by the consumer permit the consumer device 226 to create a response to the insight request. The individual response generated by a single device may include one or more elements of consumer data 222 from only the data accessible to the individual device. The consumer data 222 may be derived from consumer accessible data 224 found in and/or accessible to the consumer devices 226. The consumer data 222 may also be derived from a software agent operating on behalf of the consumer, within the rules and/or restrictions set by the consumer on any of the consumer devices, such as for example on a personal data cloud. The consumer data 222 may also be derived from the verifiable credentials in each of the digital wallets 228 of the individual consumer 220.

In an embodiment, the consumer 220 may provide automatic consent for one or more elements of consumer data 222. When the consumer 220 provides automatic consent, one or more of the elements of consumer data 222 from the consumers 220, through the consumer accessible data 224 and/or the verifiable credentials, is automatically included in the set of data available to the processing of the insight request on the consumer device. The consumer 220 may control all consumer data within the consumer accessible data 224 and/or the verifiable credentials and the consumer devices 226 and/or the digital wallets 228. The consumer 220 may also control whether to participate and/or what level of intervention regarding the responses to the queries for consumer data 222 and consumer information from the consumer accessible data 224 and/or the verifiable credentials and the consumer devices 226 and/or the digital wallets 228.

As illustrated at 254, the data insights processor on the consumer device 226 may send a data insight response directly to the third-party organization 230. The third-party organization 230 may see only the answers to the query in the form of a response provided by a consumer device 226. The third-party organization 230 may not see any consumer data sources or know the identity of who provided any of the answers to the query. The requestor or third-party organization 230 may never see any of the consumer data 222 other than what is provided in the response 254.

Further, at 254, only the data insight response is shared by the consumer with the third-party organization 230. A notification that a response was sent to the third-party organization 230 is registered with the data insights server 210. The requestor or third-party organization 230 may see the response and may not receive any identifier that can be traced to the consumer 220 directly.

Further, at 254, a system component on the consumer device 226 (e.g., a mobile phone application or an application deployed to a consumer personal online data store) may process the insight request by determining which data could be used and are authorized for use and then determining the insight result. The result may then only be sent to the insight requestor, the third-party organization 230, and would not be sent to the data insights server 210. The consumer device 226 may send a notification to the data insights server 210 to register that the consumer response was sent to the third-party organization 230. The data insights server 210 may then use this register of responses to compensate the consumer, and to bill the insight requestor or the third-party organization 230.

Further, the processing of data insight requests may be performed by any device that the consumer authorizes, i.e., it is not restricted to only mobile devices and may include software agents/programs running on behalf of a consumer in a cloud environment or other non-mobile device.

The data insights server 210 may reside either remotely or local to the user mobile computing device, or via the user computing device. If the data insights server 210 resides local to the user mobile computing device, or via the user computing device, the data insights server 210 may be integrated with the user mobile computing device, or via the user computing device via an application or other program.

The data insights server 210 may possess many of the same hardware/software components as the digital identity device 100 shown in FIG. 1. For instance, the data insights server 210 may be used by a program manager and/or insurance provider associated with the item which accompanies the digital identity device 100 associated with a data insights program. The program manager may be a separate entity that may oversee implementation and validation of a digital identity score program. Alternatively, the program manager may be one of the service providers already involved in the data insights program, including an insurance provider, financial institution, government agency, credit agency, or other service provider. The program manager may be an entity that enables data exchange and transaction processing between all parties involved in a data insights program.

Additionally, the data insights server 210 may include a machine learning algorithm that may execute or operate on the data insights server 210. The data insights server 210 may utilize a machine learning algorithm for learning trends and improving queries, data collection, responses, consolidation, and any other facets of the data insights program from historical determinations. The machine learning algorithm may utilize one or more of a variety of machine learning architectures known and used in the art. These architectures can include, but are not limited to, neural networks (NN), recurrent neural networks (RNN), convolutional neural networks (CNN), transformers, and/or probabilistic neural networks (PNN), linear regression, random forest, decision trees, k-nearest neighbors, support vector machines (SVM), logistical regression, k-means clustering, association rules. RNNs can further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. In a number of embodiments, a combination of machine learning architectures can be utilized, more specific machine learning architectures when available, and general machine learning architectures at other times can be used. Additionally, the machine learning algorithm may use semi-supervised learning and/or reinforcement learning. Additionally, the machine learning may be achieved using federated learning and/or on-device prediction techniques such that the consumer data is not disclosed to the data insights server 210. In this case, the machine learning algorithm is sent to the consumer device and the updates to the model are sent back to the insight server after the consumer device applies the consumer accessible data 222 to the model provided.

Figure 3:
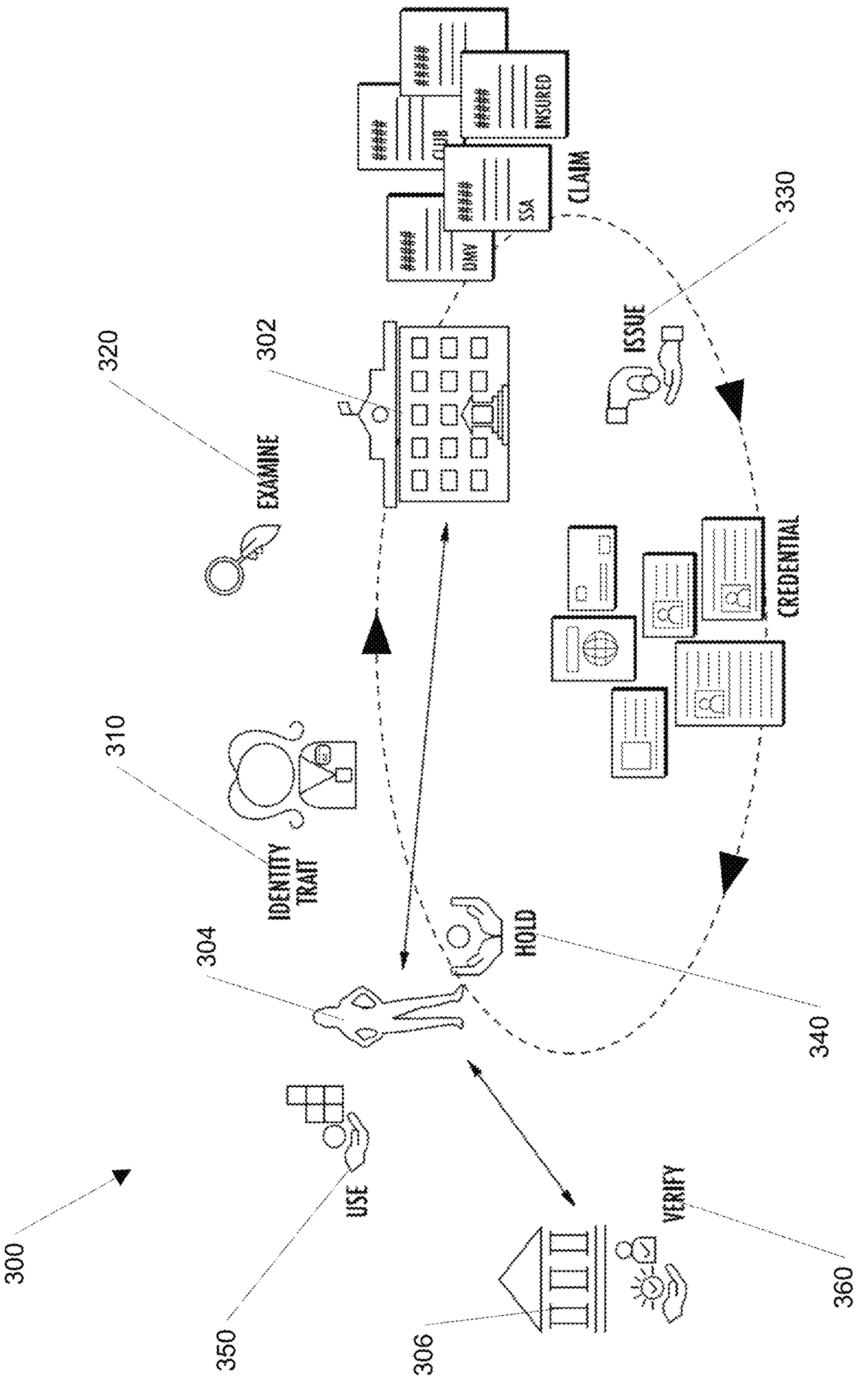
FIG. 3 illustrates a conceptual flow diagram for verifiable credentials in an exemplary digital identity system in accordance with one or more aspects described herein.

FIG. 3 illustrates a conceptual flow diagram on how verifiable credentialing may occur between issuers 302, holders (users/consumers) 304, and verifiers 306. For example, at block 310, a holder (or user/consumer) 304 may have various identity traits that may be used within the digital identity system 300. Those identity traits may help define and describe the user or consumer 304. The identity traits may include, but not be limited to: physical appearance, job title, name, email address, physical home address, social security number, age, birth place, birth date, address history, job history, college or school degree, graduation date, college or school history, etc. At block 320, an issuer 302 may examine the identity traits from the holder 304. The issuer 302 may perform required vetting, due diligence, regulatory compliance, and other tasks needed to establish confidence in making a claim about an identity trait. At block 330, the issuer 302 may issue a verifiable credential. The issuer 302 may generate and deliver a verifiable credential to the holder 304. The verifiable credential may be comprised of a set of claims in accordance with some predefined schema. At block 340, the holder 304 may hold the verifiable credential. For example, the user, individual, organization, or holder 304 may hold the verifiable credential in a digital wallet. At block 350, the holder 304 may use the verifiable credential. The holder 304 may present one or more verifiable credentials to an entity as proof of identity. At block 360, the verifier 306 may verify the verifiable credential. The verifier 306 may validate the authenticity of the issuer 302 and the holder 304 and then consume/utilize the data from the verifiable credential as required.

Figure 4:
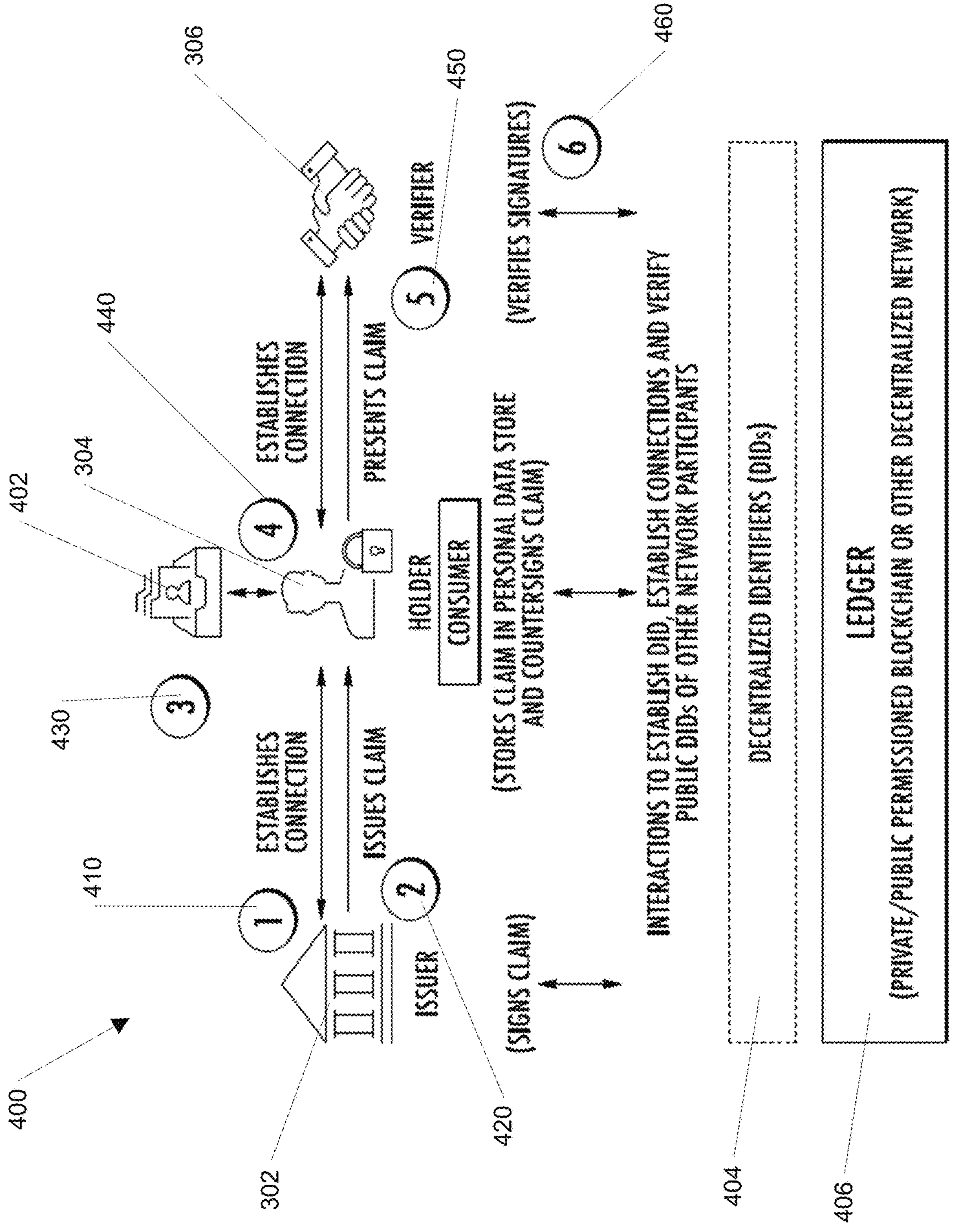
FIG. 4 illustrates another block diagram of an exemplary digital identity system in accordance with one or more aspects described herein.

FIG. 4 illustrates a similar block diagram 400 for a digital identity system 300. As illustrated in FIG. 4, the digital identity system 300 may include issuers 302, holders 304, and verifiers 306. The digital identity system 300 may also include a digital wallet 402 associated with the holders 304, decentralized identifiers (DIDs) 404, and a ledger 406. The ledger 406 may be a private or public permissioned blockchain or another decentralized network. At step 410, the issuer 302 and the holder 304 may establish a digital connection. At step 420, the issuer 302 may provide a claim on an identity credential to the identity holder 304. At step 430, the holder 304 may maintain the credential in the holder's private digital wallet 402 until the credential must be shared. At step 440, the holder 304 may establish a connection with the verifier (or reliant party) 306 to enable the secure sharing of the identity credentials held in the holder's digital wallet 402. At step 450, the holder 304 may present the claim on the identity credential to the verifier 306 and countersign the claim with the key associated with the private DID 404. At step 460, the verifier 306 may look up the registered DIDs 404 of the issuer 302 to resolve the DID documents. The verifier 306 may also verify the public key of the issuer 302. The issuer DID resolution may be to validate the claim was issued by the issuing authority. The verifier 306 may also determine if the verifiable credential has been revoked through the blockchain-based ledger 406.

Figure 5:
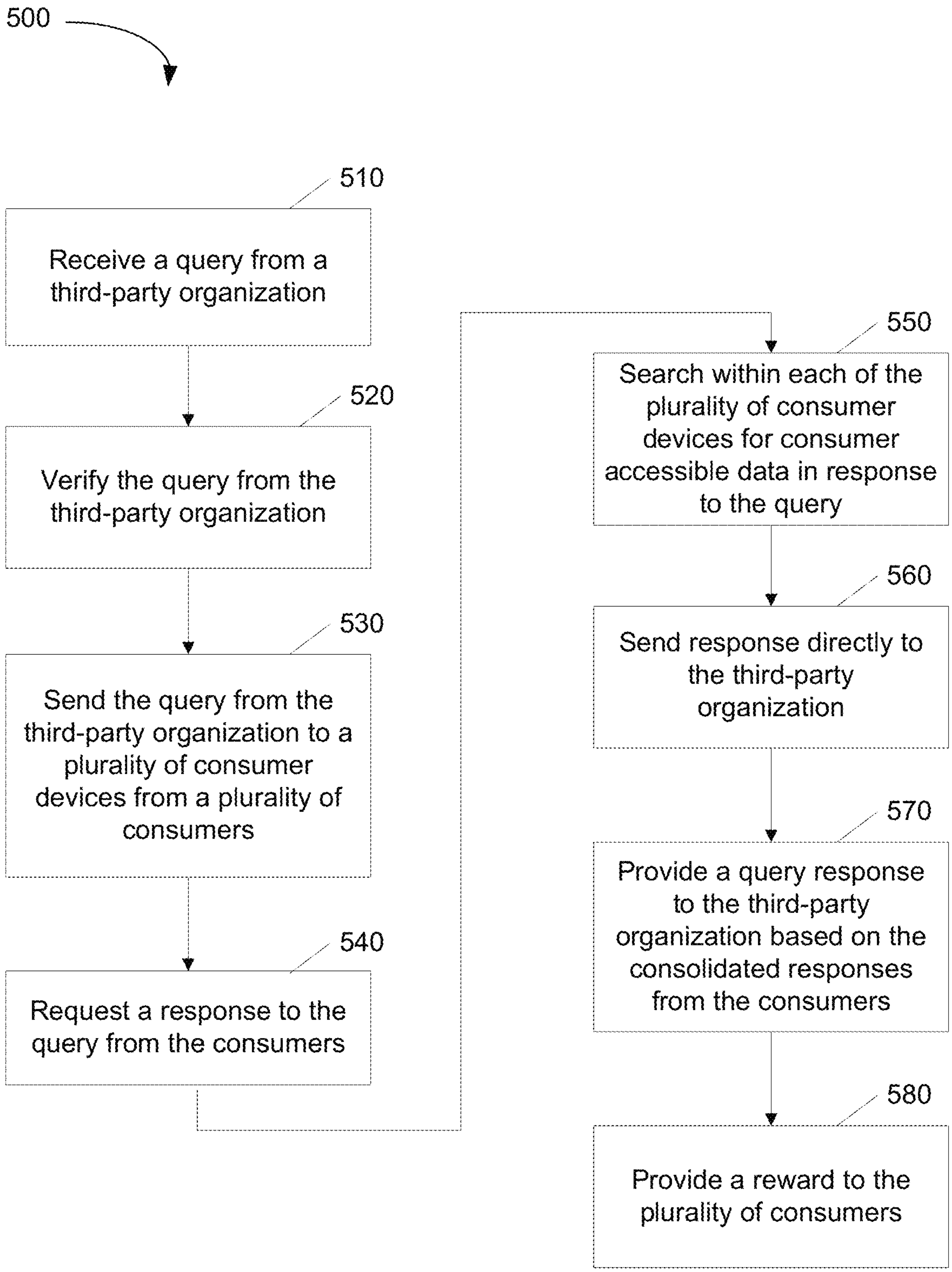
FIG. 5 illustrates an exemplary method for a data insights server in accordance with one or more aspects described herein.

The steps that follow may be implemented by one or more of the components in FIGS. 1-4 and/or other components, including other computing devices. FIG. 5 illustrates a method 500 using the data insights server 210 for providing data insights information to a third-party organization from verifiable credentials found in digital wallets of consumers.

As illustrated in step 510, a data insights server may receive a query from a processor at a third-party organization. The third-party organization may be in communication with the data insights server. The data insights server may be linked and in communication with a plurality of consumer devices from a plurality of consumers. The data insights server may also be linked and in communication with a plurality of digital wallets from the plurality of consumers. Generally, the query comprises a request for specific consumer identity information and/or consumer commerce information that may be attainable through verifiable credentials. The query may include specific consumer identity information, such as physical appearance, job title, name, email address, physical home address, social security number, age, birth place, birth date, address history, employment information, employment history, college or school degree, graduation date, college or school history, utilities, financial information, home ownership, employment information, etc. The query may also include other consumer-specific commerce information, such as where the consumer shops, how often the consumer shops, shopping habits of the consumer, purchase history of the consumer, etc.

Additionally, the data insights server and/or third-party organization may compose the query. The data insights server may only allow selected fields for composing questions for the queries. The data insights server 210 will aim to preserve the anonymity of the consumer by checking the data fields required in current and past insight requests proposed by the third-party organization 230 such that correlation between responses to different queries would not permit the third-party organization 230 to identify any consumer providing a response to an insight request.

In step 520, the data insights server may verify the query from the third-party organization.

In step 530, the data insights server may send the query from the third-party organization to a plurality of consumer devices that are owned or held by a plurality of consumers. The consumer devices may include a mobile phone application that executes on the consumer device or may include any processor/system that the consumer has authorized and configured to participate in the data insights system. The consumer devices may include an application deployed to a consumer personal online data store or personal computer.

In step 540, the data insights server may make available the insight request to consumers.

Any response to the insight request may include one or more elements of consumer data from the plurality of consumers. The consumer data may include consumer accessible data. The consumer data may include consumer accessible data on a consumer device. The consumer accessible data may include any data that the consumer can access, including their social media, personal files, or personal cloud drive storage, etc. The consumer accessible data may only include the data that the consumer explicitly chooses to include in the set of data that could contribute to answer any of the data insight questions. The one or more elements of consumer data may include, but not be limited to specific consumer identity information, such as physical appearance, job title, name, email address, physical home address, social security number, age, birth place, birth date, address history, employment information, employment history, college or school degree, graduation date, college or school history, utilities, financial information, home ownership, employment information, etc. The one or more elements of consumer data may also include, but not be limited to consumer-specific commerce information, such as where the consumer shops, how often the consumer shops, shopping habits of the consumer, purchase history of the consumer, etc. The consumer data may be derived from one or more verifiable credentials in each of the digital wallets of the plurality of consumers. The one or more elements of the consumer data derived from the consumer accessible data from the consumers may be automatically provided to the data insights server when the consumer provides automatic consent.

In step 550, the consumer device may search for consumer accessible data in response to the query. The consumer device may use software deployed to that device, such that the privacy of the consumer's data is maintained. In step 560, the response may be sent directly to the third-party organization and is not shared with the data insights server. The data insights server may receive notification of each consumer that contributed a response to each insight request so as to determine billing to the third-party organization and compensation to the consumer.

In step 570, the data insights server may provide a query response to the third-party organization based on the consolidated responses from the consumers. In step 580, the data insights server may provide a reward to the plurality of those consumers for providing insight requests. The reward may include one or more of the following: a monetary reward, a consumer goods discount, a services discount, or a digital dividend. Other rewards to consumers may be utilized in accordance with this invention.

In an example of the data insights server, a third-party business or organization may want to know how many people between the ages of 18-24 shop at a specific Sporting Goods store. The third-party business or organization may compose the query and submit it to the data insights server. The data insights server may approve or deny the request and if approved may make the request available to a plurality of the consumers. An application on the mobile device may check for active insight requests and determine using consumer privacy preferences if the request could be processed using consumer data available. This may include looking through the verifiable credentials on the consumer's digital wallet(s) for answers—i.e., looks to see if the consumer has verifiable credentials from the Sporting Goods store. The information may also be derived from other verifiable credentials in the consumer's digital wallet. Consumers may determine to check what information is being sent to the third-party organization if the consumer chooses to select this protection. The consumer may also set defaults as to what information can be queried and sent. The consumer may receive rewards for sharing their information regarding the Sporting Goods store.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A server comprising:

a processor; and one or more memory units storing computer-executable instructions, which when executed by the processor, cause the server to:

receive, from a remote system in networked communication with the server, a query for one or more elements of consumer data;

after receiving the query, communicate, to a plurality of consumer devices that are in networked communication with the server, a message that specifies the query and that indicates that one or more elements of consumer data accessible to respective consumer devices of the plurality and that are associated with the query should be communicated to the remote system from the respective consumer devices to the remote system via a communication path that does not include the server, wherein after receiving the message, each consumer device of the plurality (i) retrieves one or more of the one or more elements of consumer data associated with the query from one or more data sources locally accessible to itself, (ii) processes the consumer data locally by itself to generate a response that includes one or more of the one or more elements of consumer data such that the remote system receives only the processed response, and the server does not receive the processed response, and neither the remote system nor server obtain access to the underlying consumer data sources or consumer accessible data, and (iii) communicates, to the remote system, the response associated with the query that the consumer device is permitted to communicate such that respective identities of the one or more data sources are unknown to the remote system and the server, and wherein after one or more responses including one or more of the one or more elements of consumer data are received from each consumer device, the remote system consolidates and aggregates the one or more responses including the one or more elements of consumer data and associates the consolidated and aggregated responses including the one or more elements of consumer data with the query; and receive, from each consumer device permitted to communicate one or more of the one or more elements of consumer data to the remote system as a providing consumer device, an indication as a notification that of the response including the one or more elements of consumer data was communicated to the remote system by the providing consumer device along with an identification of the providing consumer device without access to underlying consumer data sources or consumer accessible data, and without the remote system receiving the notification along with the identification of each providing consumer device.

2. The server of claim 1, wherein one or more consumer devices receive one or more of the one or more elements of the consumer data from one or more data sources that are remote from the consumer device.

3. The server of claim 1, wherein the computer-executable instructions, when executed by the processor, further cause the server to:

compose the query, wherein the query includes selected fields for building a plurality of questions for the query.

4. The server of claim 1, wherein the query includes one or more fields filled in with the one or more elements of consumer data.

5. The server of claim 1, wherein the computer-executable instructions, when executed by the processor, further cause the server to:

verify and either approve or deny the query.

6. The server of claim 1, wherein the consumer data includes one or more of social media information or personal cloud drive storage that one or more consumers associated with the one or more consumer devices chose to make available when processing the query.

7. The server of claim 1, wherein the computer-executable instructions, when executed by the processor, further cause the server to:

based off the notification, provide a reward to one or more consumers associated with consumer devices as the providing consumer devices that communicated the one or more responses including the one or more of the elements of consumer data to the remote system, the reward comprising one or more of: a monetary reward, a consumer goods discount, a services discount, or a digital dividend.

8. A computer-implemented method comprising:

receiving, by a server and from a remote system is in networked communication the server, a query for one or more elements of consumer data;

after receiving the query, communicating, by the server and to a plurality of consumer devices that are in networked communication with the server, a message that specifies the query and that indicates that one or more elements of consumer data accessible to respective consumer devices of the plurality and that are associated with the query should be communicated to the remote system from the respective consumer devices to the remote system via a communication path that does not include the server, wherein after receiving the message, each consumer device of the plurality (i) retrieves one or more of the one or more elements of consumer data associated with the query from one or more data sources locally accessible to itself, (ii) processes the consumer data locally by itself to generate a response that includes one or more of the one or more elements of consumer data such that the remote system receives only the processed response, and the server does not receive the processed response, and neither the remote system nor server obtain access to the underlying consumer data sources or consumer accessible data, the server, and the remote system, and (iii) communicates, to the remote system, the response associated with the query that the consumer device is permitted to communicate such that respective identities of the one or more data sources are unknown to the remote system and the server, and wherein after one or more responses including one or more of the one or more elements of consumer data are received from each consumer device, the remote system consolidates and aggregates the one or more responses including the one or more elements of consumer data and associates the consolidated and aggregated responses including the one or more elements of consumer data with the query; and receiving, from each consumer device permitted to communicate one or more of the one or more elements of consumer data to the remote system as a providing consumer device, an indication as a notification that the response including the one or more elements of consumer data was communicated to the remote system by the providing consumer device along with an identification of the providing consumer device without access to underlying consumer data sources or consumer accessible data, and without the remote system receiving the notification along with the identification of each providing consumer device.

9. The computer-implemented method of claim 8, wherein one or more consumer devices receive one or more of the one or more elements of the consumer data from one or more data sources that are remote from the consumer device.

10. The computer-implemented method of claim 8, further comprising:

composing, by the server, the query, wherein the query includes selected fields for building a plurality of questions for the query.

11. The computer-implemented method of claim 8, wherein the query includes one or more fields filled in with the one or more elements of consumer data.

12. The computer-implemented method of claim 8, further comprising:

verifying and either approving or denying, by the server, the query.

13. The computer-implemented method of claim 8, wherein the consumer data includes one or more of social media information or personal cloud drive storage that one or more consumers associated with the one or more consumer devices chose to make available when processing the query.

14. The computer-implemented method of claim 8, further comprising:

based off the notification, providing, by the server, a reward to one or more consumers associated with consumer devices as the providing consumer devices that communicated the one or more responses including the one or more of the elements of consumer data to the remote system, the reward comprising one or more of: a monetary reward, a consumer goods discount, a services discount, or a digital dividend.

15. One or more non-transitory computer-readable media storing instructions that, when executed by a computing device, cause the computing device to:

receive from a remote system in networked communication with the computing device, a query for one or more elements of consumer data;

after receiving the query, communicate, to a plurality of consumer devices that are in networked communication with the computing device, a message that specifies the query and that indicates that one or more elements of consumer data accessible to the respective consumer devices of the plurality and that are associated with the query should be communicated to the remote system from the respective consumer devices to the remote system via a communication path that does not include the computing device;

wherein after receiving the message, each consumer device of the plurality (i) retrieves one or more of the one or more elements of consumer data associated with the query from one or more data sources accessible to itself, (ii) processes the consumer data locally by itself to generate a response that includes one or more of the one or more elements of consumer data such that the remote system receives only the processed response, and the computing device does not receive the processed response, and neither the remote system nor computing device obtain access to the underlying consumer data sources or consumer accessible data, and (iii) communicates, to the remote system, the response associated with the query that the consumer device is permitted to communicate such that respective identities of the one or more data sources are unknown to the remote system and the computing device, and wherein after one or more responses including one or more of the one or more elements of consumer data are received from each consumer device, the remote system consolidates and aggregates the one or more responses including the one or more elements of consumer data and associates the consolidated and aggregated responses including the one or more elements of consumer data with the query; and receive, from each consumer device permitted to communicate one or more of the one or more elements of consumer data to the remote system as a providing consumer device, an indication as a notification that the response including the one or more elements of consumer data was communicated to the remote system by the providing consumer device along with an identification of the providing consumer device without access to underlying consumer data sources or consumer accessible data, and without the remote system receiving the notification along with the identification of each providing consumer device.

16. The one or more non-transitory computer-readable media of claim 15, wherein one or more consumer devices receive one or more of the one or more elements of the consumer data from one or more data sources that are remote from the consumer device.

17. The one or more non-transitory computer-readable media of claim 15, wherein the query includes one or more fields filled in with the one or more elements of consumer data.

18. The one or more non-transitory computer-readable media of claim 15, storing further instructions that, when executed by the computing device, cause the computing device to:

verify and either approve or deny, by the computing device, the query.

19. The one or more non-transitory computer-readable media of claim 15, wherein the consumer data includes one or more of social media information or personal cloud drive storage that one or more consumers associated with the one or more consumer devices chose to make available when processing the query.

20. The one or more non-transitory computer-readable media of claim 15, storing further instructions that, when executed by the computing device, cause the computing device to:

based off the notification, provide a reward to one or more consumers associated with consumer devices as the providing consumer devices that communicated the one or more responses including the one or more of the elements of consumer data to the remote system, the reward comprising one or more of: a monetary reward, a consumer goods discount, a services discount, or a digital dividend.

* * * * *